[11] 3,581,219

[72] Inventor David C. Alexander
 Yorktown Heights, N.Y.
[21] Appl. No. 677,685
[22] Filed Oct. 24, 1967
[45] Patented May 25, 1971
[73] Assignee International Business Machines Corporation
 Armonk, N.Y.

[54] SYSTEM FOR DYNAMICALLY ADJUSTING CLIPPING IN EDITING ELECTROCARDIOGRAM WAVES
 4 Claims, 5 Drawing Figs.
[52] U.S. Cl. .................................................... 328/168,
 307/235, 307/237, 324/77, 328/117, 328/165,
 328/169
[51] Int. Cl. ...................................................... H03k 5/08
[50] Field of Search .......................................... 307/235,
 237; 328/114, 115.7, 165, 167, 168, 169, 171;
 324/77

[56] References Cited
UNITED STATES PATENTS
2,497,693 2/1950 Shea ............................ 328/115
3,353,106 11/1967 Dudek et al. ................. 307/235X

*Primary Examiner*—Donald D. Forrer
*Assistant Examiner*—John Zazworsky
*Attorneys*—Edwin M. Thomas, Ralph L. Thomas and Thomas & Thomas

ABSTRACT: The disclosure sets forth a feedback system for dynamically adjusting the clipping levels in electrocardiogram analyses. The input-analog data is used to control the sampling rate in such a manner that only enough samples, including all significant deviations, are taken to describe the wave adequately. This makes it unnecessary to take a very large number of samples on a noisy record while it avoids missing important points.

SYSTEM FOR DYNAMICALLY ADJUSTING CLIPPING IN EDITING ELECTROCARDIOGRAM WAVES

BACKGROUND OF THE INVENTION

In recent years a number of efforts have been made to interpret electrocardiogram waves by electronic means such as by use of analog computers and/or digital type electronic data processing equipment. Because abnormalities may sometimes be widely spaced on an electrocardiogram, it has been found necessary frequently to take long and extensive records. In some of these systems, waveforms are transmitted in real time modes to the central data processing area where they are inputted to the electronic processing equipment. In some of these devices a group or series consisting of a large number of pulses or waves resulting from particular phenomena, as detected by the electrocardiogram, are utilized. Interpretation of such data in detail requires considerable data handling.

In electrocardiograph equipment, as is well known, various and fairly numerous types of signals are obtained. They include, firstly, the principal waves of the electrocardiogram which show the major contractions and relaxations of the heart muscles. Supplementary data may be derived, however, including such detailed records as the electroencephalogram (EEG), superimposed traces such as galvanic skin responses (GSR) and the like. The electrocardiogram traces commonly include also groups or series of waves or pulses which apparently result from depolarization of the ventricles of the heart prior to contraction. These signals are often referred to as the QRS complex. Immediately preceding each QRS series is normally a small pulse which results from initiation of the muscular activity and is known as the P wave. Another signal which follows the group of pulses is commonly known as the T wave, the latter being separated from the QRS series by a so-called ST segment.

It has previously been suggested that instead of data processing the whole system of waves obtained in the electrocardiograph, a method involving employment of a modified differentiation editing circuit may be used. Such a system has been devised to sample the wave at points of significant change points, e.g. at peaks, valleys, or at the starts and ends of rises and falls in the wave form. This system has the advantages of reducing the required data sampling rate to an average of about 20 pulses or signals per second, which is a whole order of magnitude less than for the equal interval sampling method. Obviously, the amount of computer time required is decreased proportionately. Thus data have been taken of the P amplitude, PR level, PR interval, QRS amplitude, the average QRS amplitude, the QRS interval, the QT interval, the ST level, the T amplitude, as well as factors of heart rate and isoelectric level. In the system just described, the EKG data are amplified and fed to a low-pass filter to take out high frequency noise, especially 60-cycle noise. This filter has a cutoff frequency of 30 of CPS, dropping off at about 30 db per octave. The output of this low-pass filter is an input to one channel of the strip recorder, which has two channels, and also to an editing circuit. This is a single-shot combination which produces a pulse at each significant change in the wave shape. This "change" is then an input to the other channel of the strip chart recorder. As a result, the heart beat data were made to stand out simply and sharply, facilitating manual digitization, including pulse time and amplitude. Subsequently, the data so obtained were fed to a digital computer for analysis. The points indicated by the editing circuit were used for making the respective measurements. See "Analysis and Pattern Recognition of Electrocardiogram Wave Forms Using a Simulated On-Line Hybrid Computer System," by D. Wortzman et al., 16th Annual Conference on Engineering in Medicine and Biology, Baltimore, Md., Nov. 18—20, 1963 (Proceedings). The system just described lacked a desirable feature in that it had a tendency to gloss over minor higher frequency wave fluctuations which in some cased might be of significance.

SUMMARY OF THE INVENTION

According to the present invention, a feedback system is devised for dynamically adjusting the clipping levels of comparators, so as to take out noise and other unnecessary high frequency signals. By this means, the clipping level is increased where the record is noisy. The high clippers are essentially unchanged as compared to the Wortzman system described above but their primary function becomes that of selecting points on high slope portions of EKG waves, e.g. the QRS waves mentioned above.

Low clippers are provided also. These may respond to QRS waves but they are intended to locate the relatively low slopes of the P and T waves. Since only the low slopes are of interest here, it is possible to reduce the noise on the signal presented to the low clippers. This is done by adding a filter which reduces the band width that is passed on.

The invention includes a single-shot and capacitor means which set the desired low clipping levels. In the absence of inputs, these clipping levels are designed to drop to a minimum. Whenever a threshold is crossed, the system permits a measured amount of charge to be added to the corresponding capacitor from the current output of its single shot. Thus each clipping level will be raised, in this case as a logarithmic function of the number of points it selects.

The filters and associated elements are designed to give higher clipping levels for noisy records and to select only large noise excursions and noise which adds to the signal to produce a larger excursion.

Conversely, clipping levels normally will be lowest in the relatively quiet T to P interval on the electrocardiogram. This design minimizes chances of missing the relatively small but often significant P wave itself. Since clipping levels are raised only as a function of the number of points picked, and not as a function of the actual wave form, clipping levels are not elevated to an objectionable degree after a large, high slope QRS wave or wave series. Two independent circuits are used to provide ability to compensate for a small DC offset from the filter.

A further feature is elimination of a delay circuit in the analog path which was used in the prior art system. Conversions are made at a uniform rate, with flag bits appended, to indicate selected points to the computer program. With this arrangement the program makes the necessary adjustments to compensate the delay.

The circuit of this invention "edits" a time variant wave form, especially for but not necessarily limited to electrocardiograms. This is accomplished by sampling the wave form only at definitive slope conditions. The system provides two outputs in the form of pulses which sample the raw wave form for analog-to-digital conversion to be entered into and analyzed by the computer. The "clipper" circuits are actually voltage comparators which yield a binary one output whenever variable input voltage equals or exceeds a reference voltage.

It is one object of the invention to provide dynamic adjustment for the clipping levels of the prior art and a further object is to cut out unessential noise while retaining the capability of picking up minor signals of significance in relatively quiet portions of the record.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
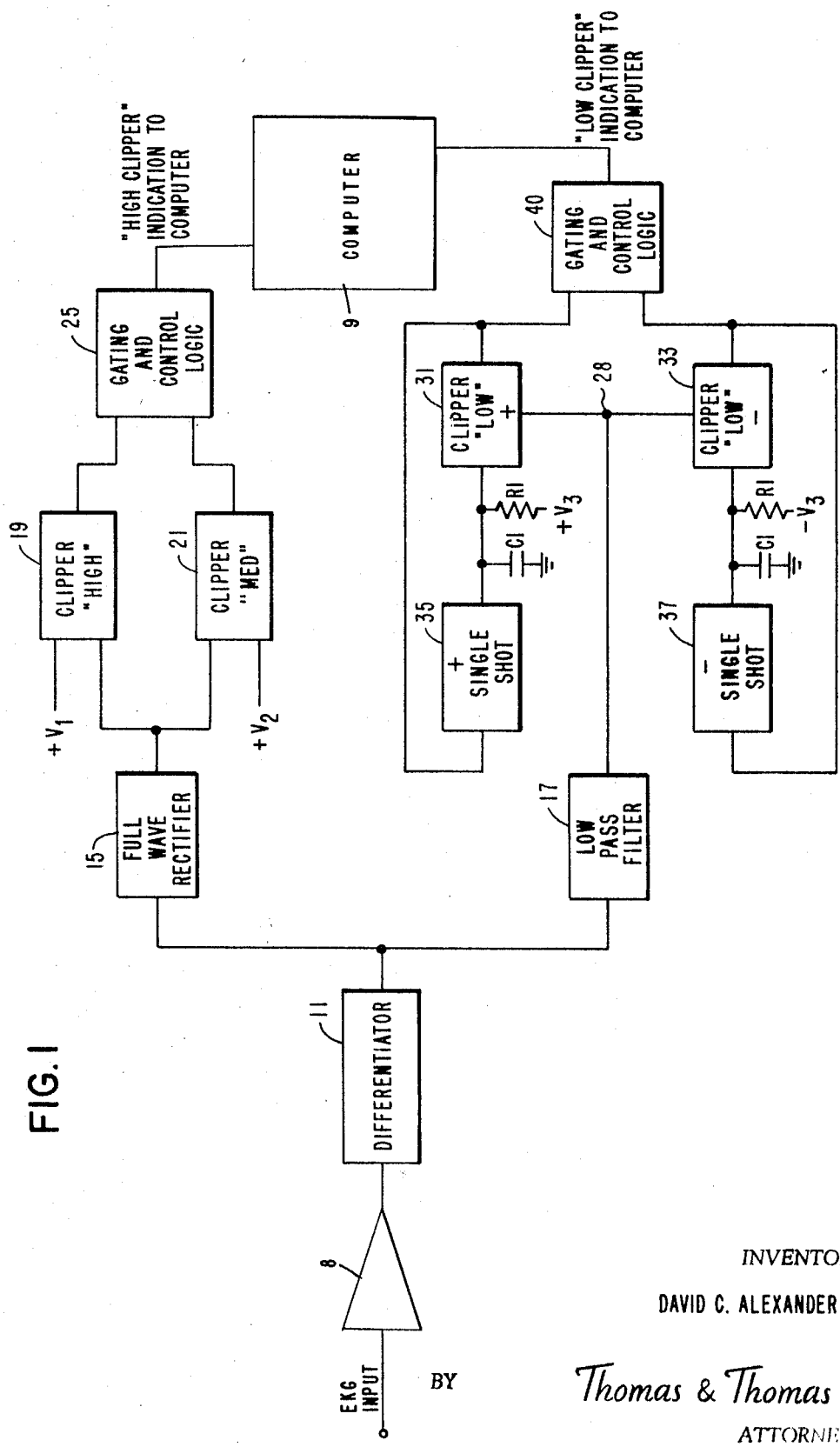
FIG. 1 is a block diagram of the invention.

Referring now to FIG. 1 there is shown a block diagram of the system. It includes a differentiator 11 which receives the amplified output from the amplifier 8 of the electrocardiograph device. The system also includes an elimination filter unit 13, not shown in FIG. 1 but shown at the top of FIG. 3A. This is a diagram of a 50 HZ narrow-band elimination filter which is used to eliminate power line frequency. This particular model is designed for 50 cycle current, which is widely employed in Europe and other parts of the world. In the United States a 60 HZ unit would be substituted. The differences are not important, however, for purposes of this invention. By screening out the undesirable power line frequency fluctuations, the electrocardiogram left to be scanned is substantially clarified, making its recording and analysis in the computer 9 clearer. This elimination filter may precede the differentiator in the circuit.

The differentiator 11 is of a well known construction and design such as that described on page 49 of "Applications Manual for Computing Amplifiers," published by Philbrick Researches, Inc. of Detham, Mass. The differentiator 11 is shown in detail in the lower left hand part of FIG. 3A where the dotted line, box 11, corresponds to box 11 of FIG. 1. From the differentiator the signal goes to a full-wave rectifier 15, shown also in dotted line box 15 at the bottom center of FIG. 3A. The rectifier is designed to show the rate of change in the signal voltage, regardless of direction of such change in the signal. A suitable four-way rectifier is shown also on page 59 of the manual just mentioned. The specific design of the rectifier forms no part of the present invention. This device does away with the distinction between positive and negative signals so that positive and negative slopes look alike to the unit which follows. The purpose for this will be explained further below.

The output signal from the differentiator also passes to a low-pass filter unit 17. This device is shown in detail in the middle left of FIG. 3A. The circuit is so designed that a low-slope on the curve of the signal, for example, changes slowly to let the signal through. This low-pass filter device is of conventional type. It is shown here as a three-slope active filter, including an operational amplifier, 18, which embodies four resistors and three capacitors. A good example of this is described in detail in Appendix 8 of "Radiotelemetry" by Nichols and Rauch. Per se, the filter is not part of the invention but it is a significant part of the combination.

The output from the full-wave rectifier is taken to clippers 19 and 21 which are designated, respectively, "clipper-high" and "clipper-medium" in FIG. 1. These are shown combined in the box 20, at the lower right of FIG. 3A, where the circuits are given in detail. The high clipper 19 has a high threshold and indicates to the computer 9 whether or not this threshold has been crossed by the signal. Similarly the medium clipper 21 clips off only the signals below the medium level. The clippers are straight comparators of a type known in the prior art. Signals from both of these devices go to the gating and control logic 25. See also the lower part FIG. 3B.

From the clippers the signal voltage is screened so that only the high or medium high portions pass on to the logic unit and are given eventually as an indication to a load device such as the computer. The output at this point gives an indication to the computer that a significant change of some kind is coming along and thereby alerts the computer to record it in detail. The details to be recorded are supplied by other parts of the circuit to be described in further detail below.

Figure 3C:
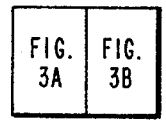
FIG. 3C shows the relationship between FIGS. 3A and 3B.
Figure 3B:
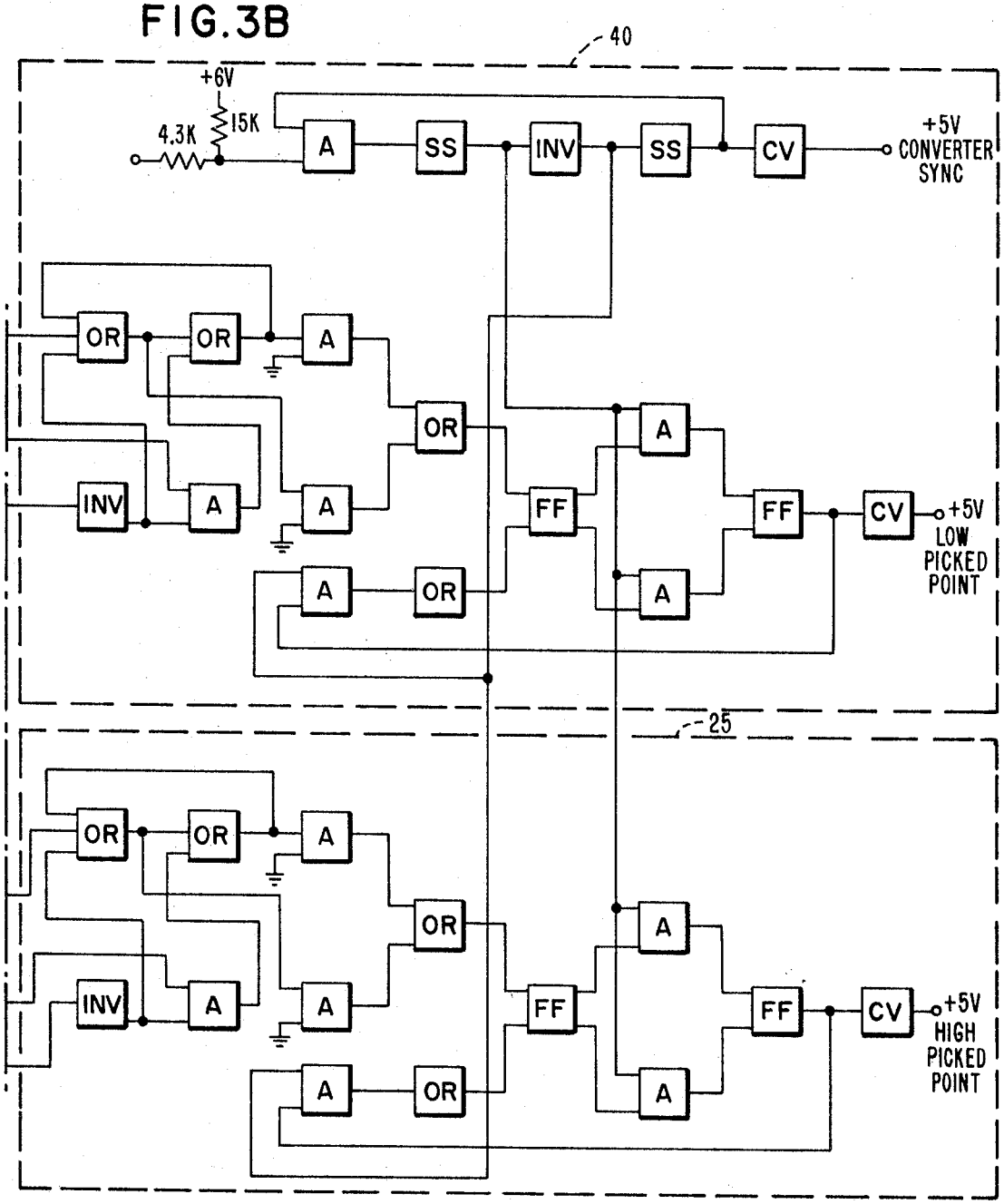
FIGS. 3A and 3B are the wiring diagrams, with some components shown in block for simplification.
Figure 3A:
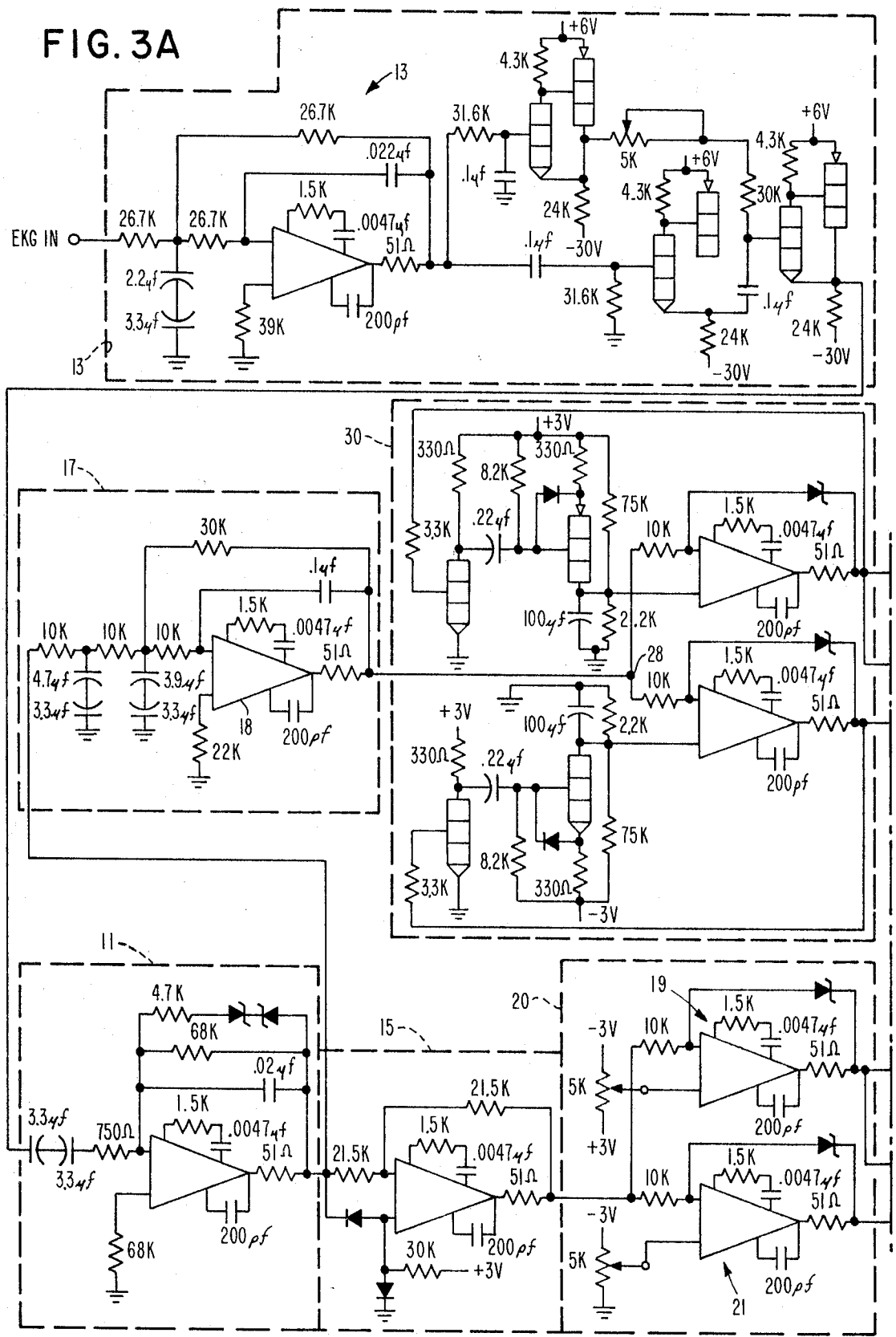

The gating and control logic just mentioned, indicated at 25, FIG. 1, and in detail in the box 25 at the bottom of FIG. 3B, is simply a binary device showing that the threshold level has or has not been crossed.

Figure 2:
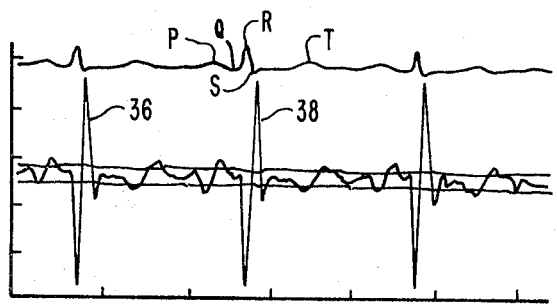
FIG. 2 is a graph showing how the original electrocardiogram is clipped or simplified.

Referring next to the lower part of FIG. 1, the signal from the low-pass filter 17 goes to a junction 28, from which it is compared in either a positive low-clipper or a negative low-clipper, depending on the polarity of the signal voltage. The circuits here each include a "single shot" device, which trips and resets after the signal passes. A capacitor $C_1$ and a resistor $R_1$ is included in each case. These circuits 31, 33 set the desired low clipping levels in conjunction with single shot circuits 35, 37, FIG. 1. The circuitry is shown in detail in the box 30, as already mentioned. In the absence of any inputs from the low-pass filter 17, the clipping levels drop to a minimum. Each time the threshold of the low-pass filter is crossed by a signal, however, a measured amount of charge, either positive or negative, is added to the appropriate capacitor $C_1$ in the low-clipper circuit. The single shot device allows the pulse to go through to the capacitor, increasing the charge thereon by an appropriate increment. Thus, each clipping level will be raised a notch, so to speak, as each signal comes through. The circuitry is so designed that the clipping level will be raised as a logarithmic function of the number of points it selects. The result is that the clipping levels are automatically raised higher for noisy records and are lowered for relatively quiet records. Thus, for a noisy record, only the larger noise excursions are noticed, e.g. at 36, 38 in FIG. 2. Noise which adds to the signal to produce a still larger excursion is noticed particularly. In other words, the capacitor involved shows a voltage which increases each time the threshold is crossed in the appropriate direction, positive or negative. Conversely, clipping levels will be lowest after relatively quiet parts of the electrocardiogram, e.g. from T to P. See the discussion above regarding QRS, T, P, etc. The points T and P as shown on the top line of FIG. 2 are quite unreliable compared to points 36, 38 in the lower graph. Thus the chances of minimizing a wave which has important implications, e.g. a small but significant P wave, or change in a series of P waves, are minimized. Since the clipping levels are raised only as a function of the number of points picked, and not in proportion to the actual wave form, the clipping levels are not unduly elevated, even after a large high-slope portion, e.g. a QRS part of a curve.

The output of the positive and negative low clippers, with their associated positive and negative single-shot circuits and RC units, goes to a gating and control logic 40, shown in detail in the upper part of FIG. 3B. The "and" (A) "or," "Single shot" (SS), inverter (INV) and voltage converter (CV) elements are all shown and their operation is quite conventional.

The two independent circuits shown are used in order to provide ability to compensate for a small DC offset from the filter.

An advantage of the present invention is the elimination of a delay circuit in the analog path which hitherto was needed to compensate for delay in the various blocks shown in FIG. 1. As a result, conversions are made at a uniform rate with flag bits appended to indicate selected points for the computer program. The program then makes adjustments necessary to compensate for the delay.

The circuit described above thus "edits" a time variant wave form, such as an electrocardiogram (EKG) by sampling the wave form only at definitive slope conditions. The "clipper" circuits are actually voltage comparators which yield a binary one output when the variable input voltage equals or exceeds the reference voltage.

In FIG. 2 a comparison between the original electrocardiogram and the output signal is shown dramatically. Because of the low but variable clipping levels, both positive and negative, the numerous unnecessary sample points which otherwise would be taken on the conventional electrocardiogram are substantially eliminated from the input to the computer, greatly reducing the load thereon, by as much as a whole order of magnitude or more. The resulting signal which goes to the computer is greatly simplified, but significant changes are not erased in the simplification. This makes it possible for the computer, as well as for the visual observer, to select the points or changes in voltage, small or large, which are truly significant, or which show a distinct change from normal cycles, indicating, for example, a particular problem in the patient whose electrocardiogram is being recorded.

The outputs at the right of FIG. 1, i.e. the outputs of the two clipper circuits, are pulses which indicate to the computer points of particular interest in the EKG shown in the upper chart of FIG. 2 for entry into and analysis by the computer.

Although the invention has been described with particular reference to its application, apparatus-wise, to analysis of electrocardiograms (EKG) with their QRS and other components, it will be understood that it involves both apparatus and process aspects and that these are applicable to other records such as electroencephelograms (EEG), and other records. This includes the component features of such records and recordings, e.g. galvanic skin response signals (GSR) and the like.

The feedback system of the present invention dynamically adjusts the clipping levels in an earlier system devised by Wortzman (which was designed to sample the wave at significant points) and makes it possible to avoid taking an unnecessary large number of samples to be certain of getting all the significant samples. Only enough samples are taken to describe the wave adequately.

While the invention has been particularly shown and described with reference to a preferred embodiment thereof, it will be understood by those skilled in the art that various changes in form and details may be made therein without departing from the spirit and scope of the invention.

What I claim is:

1. A system for analyzing a complex wave form which comprises, in combination, an amplifier for amplifying the wave form, a filter connected to the amplifier for eliminating power fluctuations from the wave form, a differentiator connected to said filter, a full wave rectifier connected to said differentiator, a first clipper and a second clipper connected to said full wave rectifier, said first clipper serving to clip signals of relatively large amplitude, said second clipper serving to clip signals of a relatively large amplitude which is greater than the amplitude of signals clipped by said first clipper, a low pass filter connected to said differentiator, a third clipper and a fourth clipper connected to said low-pass filter, a first bias circuit including a first resistor and a first condenser connected to said third clipper, a first single-shot connected to said first bias circuit, a second bias circuit including a second resistor and a second condenser connected to said fourth clipper, a second single-shot connected to said second bias circuit, said first clipper, said second clipper, said third clipper, and said fourth clipper having outputs provided through control means to a computer, means connecting the output of said third clipper to said first single shot, and means connecting the output of said fourth clipper to said second single shot, whereby the bias level of said first and second bias circuits varies as a function of the changes of the complex waveform.

2. A system for analyzing a complex waveform which comprises, in combination, first means responsive to the complex waveform for clipping portions of the complex waveform having a relatively large amplitude, second means responsive to the complex waveform for clipping portions of the complex wave having relatively low amplitude, said first means and said second means having outputs connected to a load device, said second means including a first clipper and a second clipper, a first bias circuit including a first resister and a first condenser connected to said first clipper, a first single-shot connected to said first bias circuit, a second bias circuit including a second resister and a second condenser connected to said second clipper, a second single-shot connected to said second bias circuit, means connecting the output of first clipper to said first single-shot, and means connecting the output of said second clipper to said second single-shot whereby the bias level of said first and second bias circuits varies as a function of the changes of the complex waveform.

3. A system for analyzing a complex waveform which comprises, in combination, first means responsive to the complex wave for clipping portions of the complex waveform having a relatively low amplitude, said first means including a first clipper and a second clipper, a first bias circuit including a first resister and a first condenser connected to said first clipper, a first single-shot connected to said first bias circuit, a second bias circuit including a second resister and a second condenser connected to said second clipper, a second single-shot connected to said second bias circuit, means connecting the output of said first clipper to said first single-shot, means connecting the output of said second clipper to said second single-shot whereby the bias level of said first and second bias circuits varies as a function of the changes in the complex waveform, second means responsive to the complex waveform for clipping portions of the complex waveform having a relatively large amplitude, said second means including a third clipper and a fourth clipper, a third bias circuit connected to said third clipper, a fourth bias circuit connected to said fourth clipper, said third and fourth clippers serving to clip signals of a relatively large amplitude, and said fourth clipper being biased by said fourth bias circuit to clip signals of a large amplitude which is greater than the amplitude of signals clipped by said third clipper.

4. A system for analyzing a complex waveform which comprises, in combination, a full wave rectifier responsive to the complex waveform, a first clipper and a second clipper connected to said full wave rectifier, said first clipper serving to clip signals of relatively large amplitude, said second clipper serving to clip signals of a relatively large amplitude which is greater than the amplitude of signals clipped by said first clipper, a low-pass filter responsive to the complex waveform, a third clipper and a fourth clipper connected to said low-pass filter, a first bias circuit including a first resister and a first condenser connected to said third clipper, a first single-shot connected to said first bias circuit, a second bias circuit including a second resister and a second condenser connected to said fourth clipper, a second single-shot connected to said second bias circuit, said first clipper, said second clipper, said third clipper, and said fourth clipper having outputs provided through control means to a load device, means connecting the output of said third clipper to said first single-shot, and means connecting the output of said fourth clipper to said second single-shot, whereby the bias level of said first and said bias circuits varies as a function of the changes in the complex waveform.